(12) United States Patent
Gosselin et al.

(10) Patent No.: US 8,950,286 B2
(45) Date of Patent: Feb. 10, 2015

(54) ROBOT OR HAPTIC INTERFACE STRUCTURE WITH PARALLEL ARMS

(75) Inventors: Florian Gosselin, Vanves (FR); Fabien Ferlay, Taulignan (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 358 days.

(21) Appl. No.: 13/499,427

(22) PCT Filed: Oct. 1, 2010

(86) PCT No.: PCT/EP2010/064623
§ 371 (c)(1),
(2), (4) Date: May 31, 2012

(87) PCT Pub. No.: WO2011/039341
PCT Pub. Date: Apr. 7, 2011

(65) Prior Publication Data
US 2012/0234126 A1  Sep. 20, 2012

(30) Foreign Application Priority Data

Oct. 2, 2009   (FR) ...................................... 09 56901
Nov. 13, 2009  (FR) ...................................... 09 58006

(51) Int. Cl.
*B25J 17/00* (2006.01)
*B25J 17/02* (2006.01)
(Continued)

(52) U.S. Cl.
CPC .. *B25J 13/02* (2013.01); *B25J 3/04* (2013.01); *Y10S 901/25* (2013.01)
USPC ........................ 74/490.06; 74/490.05; 901/25

(58) Field of Classification Search
CPC ........... A61B 19/22; A61B 2019/2242; A61B 19/2203; A61B 2019/2234; A61B 2019/2292; A61B 2019/2296; B25J 13/02; B25J 17/02; B25J 17/025; B25J 9/102; B25J 3/04; G05G 9/04737; G05G 5/03

USPC ............... 74/490.01, 490.02, 490.03, 490.04, 74/490.05, 490.06, 490.11; 901/14, 15, 901/19, 20, 25, 34
See application file for complete search history.

(56) References Cited

U.S. PATENT DOCUMENTS 5,178,032 A * 1/1993 Zona et al. ................. 74/479.01
5,193,963 A * 3/1993 McAffee et al. .................. 414/5
(Continued)

FOREIGN PATENT DOCUMENTS

EP  1 084 802 A2   3/2001
EP  1 870 214 A1  12/2007
(Continued)

OTHER PUBLICATIONS

French Preliminary Search Report Issued Feb. 18, 2010 in Patent Application No. FR 0956901 (with English Translation of Categories of Cited Documents).
(Continued)

*Primary Examiner* — Troy Chambers
*Assistant Examiner* — Jake Cook
(74) *Attorney, Agent, or Firm* — Oblon, Spivak, McClelland, Maier & Neustadt, L.L.P.

(57) ABSTRACT

A structure with six degrees of freedom for a robot or haptic interface including a base, two branches in parallel, and a wrist joint. The branches are installed articulated between the base and the wrist joint, the branches including a shoulder, an arm, and a forearm supporting the wrist joint. The wrist joint includes a connecting segment onto which a handle holder is articulated about a first rotation axis. A handle is articulated in rotation on the handle holder about a second rotation axis, the handle capable of being moved in rotation about the first axis, the second axis, and a third axis, and a mechanism gears down the rotation of the handle holder about at least the first rotation axis relative to rotation of the connecting segment.

53 Claims, 9 Drawing Sheets

(51) Int. Cl.
*B25J 18/00* (2006.01)
*B25J 13/02* (2006.01)
*B25J 3/04* (2006.01)

(56) References Cited

U.S. PATENT DOCUMENTS

| | | | |
|---|---|---|---|
| 5,207,114 A * | 5/1993 | Salisbury et al. | 74/479.01 |
| 7,086,307 B2 | 8/2006 | Gosselin et al. | |
| 7,107,090 B2 * | 9/2006 | Salisbury et al. | 600/427 |
| 2003/0151379 A1 | 8/2003 | Gosselin et al. | |
| 2013/0090194 A1 | 4/2013 | Ferlay et al. | |

FOREIGN PATENT DOCUMENTS

| | | |
|---|---|---|
| FR | 2 853 272 A1 | 10/2004 |
| JP | 2006-522290 | 9/2006 |
| JP | 2009-545459 | 12/2009 |
| WO | WO 87/04540 A1 | 7/1987 |
| WO | WO 89/05217 A1 | 6/1989 |
| WO | WO 01/87547 A1 | 11/2001 |

OTHER PUBLICATIONS

French Preliminary Search Report Issued Feb. 18, 2010 in Patent Application No. FR 0958006 (with English Translation of Categories of Cited Documents).

Hiroo Iwata, "Pen-based Haptic Virtual Environment", Institute of Engineering Mechanics, University of Tsukuba, IEEE, 1993, pp. 287-292.

Office Action issued Jul. 7, 2014 in Japanese Patent Application No. 2012-531440 (with English translation).

* cited by examiner

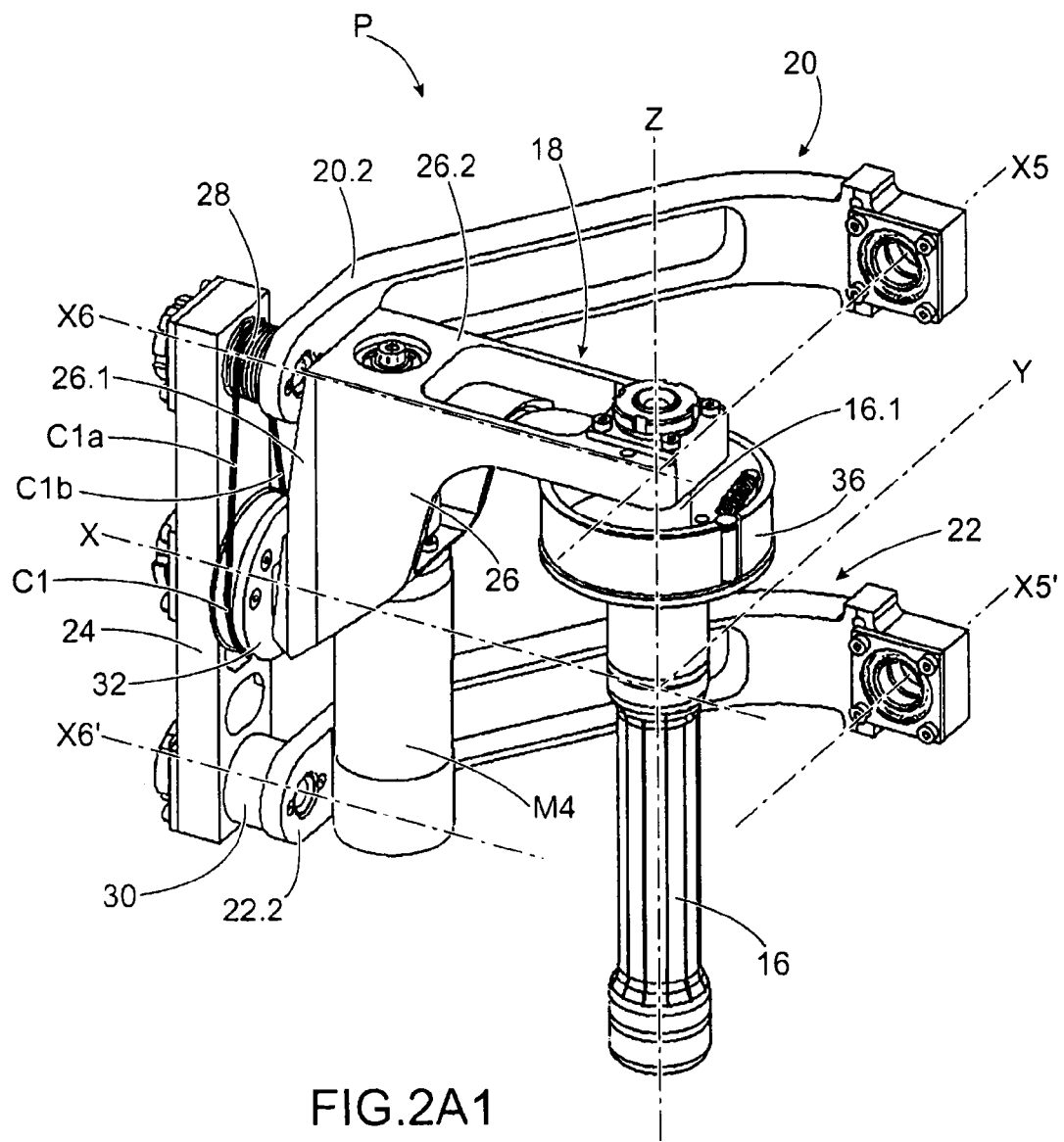
FIG.2A1

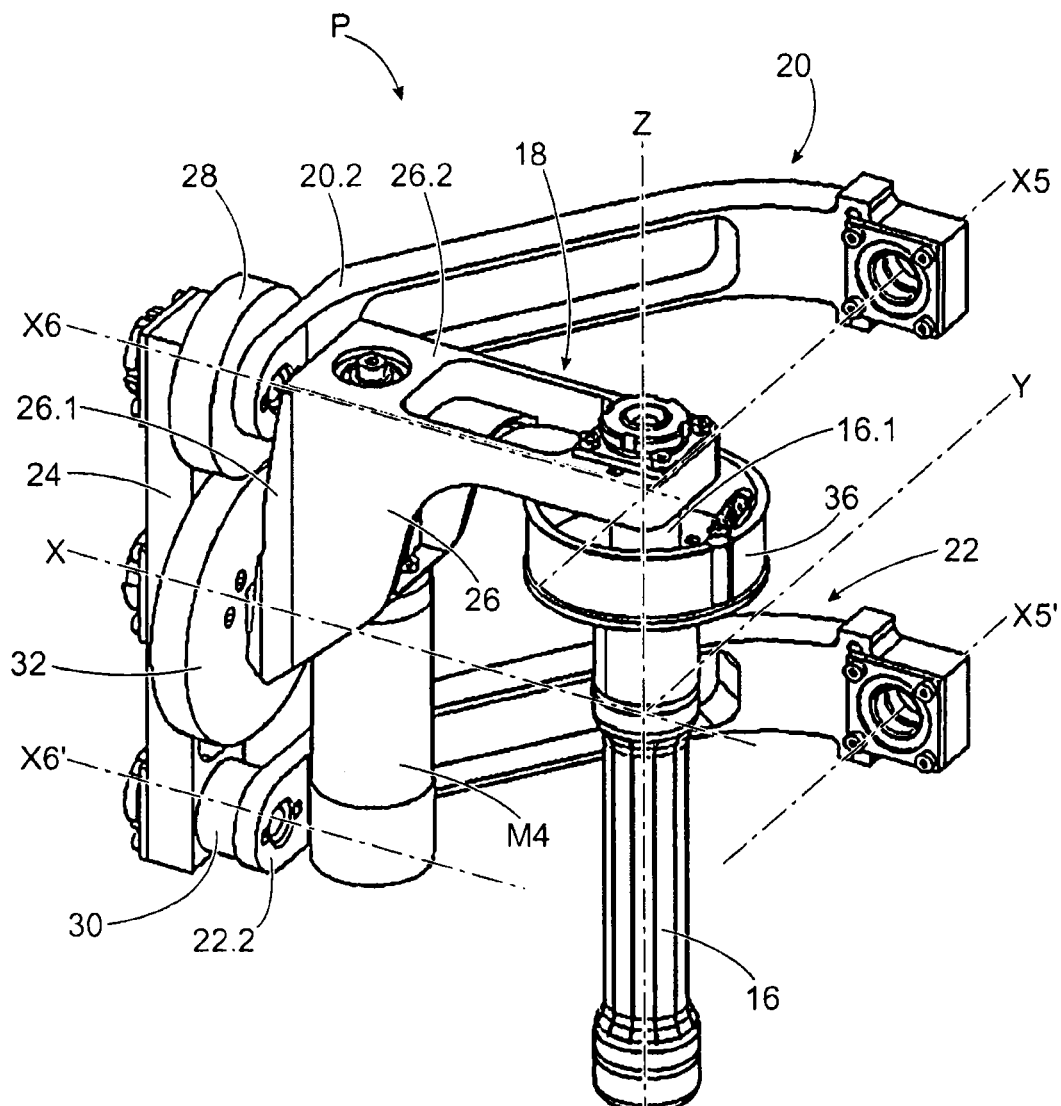
FIG.2A2

ROBOT OR HAPTIC INTERFACE STRUCTURE WITH PARALLEL ARMS

TECHNICAL FIELD AND PRIOR ART

This invention relates to a robot or haptic interface structure with parallel arms, and to a robot and a haptic interface with six degrees of freedom comprising at least such a structure.

A haptic interface enables an individual to interact with a virtual environment or to remotely control a robot, by applying a reaction to the user.

This interface is usually manipulated by hand.

In order to make the haptic interface as generic as possible, an attempt is made to have six degrees of freedom, with three degrees of freedom in translation and three degrees of freedom in rotation, so as to be able to manipulate the virtual environment or the remote robot in all directions.

An attempt is also made to reduce configurations in which singularities can occur, i.e. configurations in which there are local disappearances of degrees of freedom or the appearance of uncontrolled movements.

Finally, it is desirable to have the most uniform possible behaviour in all directions.

There are two types of architectures of robots or haptic interfaces:
- a series architecture composed of a single articulated chain of several bodies arranged between a fixed base and the handle gripped by the user. This architecture gives a large working area, however it offers limited dynamics because each articulated body carries downstream bodies,
- the parallel architecture composed of several articulated branches arranged between a fixed base and a mobile platform itself supporting the handle manipulated by the user. This architecture gives good dynamics but its working space is limited.

A good compromise is obtained with a mixed architecture comprising a stage with a parallel architecture composed of two articulated branches each composed of a shoulder, an arm and a forearm, these two branches being arranged between a fixed base and a wrist joint, itself supporting the handle manipulated by the user, in series.

This architecture gives a good working space and good dynamics.

However, in parallel or mixed structures according to the state of the art, rotation movements are not sufficiently decoupled from translation movements, i.e. pure or almost pure rotation movements are not obtained.

Furthermore, the working space is limited due to risks of collision between branches.

These disadvantages also exist in robot structures according to the state of the art.

Consequently, one purpose of this invention is to provide a robot or haptic interface structure providing a large working area.

DESCRIPTION OF THE INVENTION

The previously mentioned purpose is achieved using an architecture with two branches in parallel mounted articulated on a base and supporting a wrist joint, the wrist joint comprising a connecting segment on which a handle holder is articulated and on which a handle is articulated, the handle being free to move in rotation about three orthogonal axes, in which means are provided for amplification of handle rotation movements relative to the connecting segment, the connecting segment itself being articulated on the branches.

In other words, the rotation of the handle is selectively geared down from the connecting segment, so that risks of collisions between the branches can be reduced and the working space can be increased.

Advantageously, a device for holding the orientation of the first rotation axis of the wrist joint is provided between the branches of the device and the wrist joint, so that singularities are outside the working space.

In one advantageous embodiment, couplings between rotation and translation movements are reduced or even eliminated.

This is done by providing an architecture of the wrist joint such that it enables three rotation axes of the handle to be concurrent.

For example, the wrist joint comprises two supports articulated on the branches of the structure, these two elements having a curved shape, thus freeing the zone in which the intersection point of the rotation axes is located, so that an operator can manipulate the handle at the intersection point.

The subject-matter of this invention is then mainly a structure with six degrees of freedom for a robot or an haptic interface comprising a base, two branches in parallel and a wrist joint, said branches being installed articulated at one end on the base and at the other end on the wrist joint, said branches each comprising a shoulder on the base end, an arm and a forearm on the wrist joint end, the forearm being articulated onto the arm, said wrist joint comprising a connecting element onto which a handle holder is articulated about a first rotation axis, a handle articulated in rotation on the handle holder about a second rotation axis, said handle being capable of being moved in rotation about the first axis, the second axis and a third axis, said structure also comprising means of gearing down the rotation of said handle holder about at least the first rotation axis relative to rotation of the connecting segment.

Advantageously, at least two of the three axes are orthogonal.

The wrist joint advantageously comprises two segments, connecting the connecting segment to the forearms, the connecting segment being articulated in rotation on the first and second segments, about two axes, one of said two axes being parallel to the first axis, said segments each being articulated in rotation on the forearms about the two axes, said segments having a curved shape, and this curved part being approximately centred on the second axis.

According to a first embodiment, the structure comprises holding segments at the end of the forearms and the wrist joint also comprises two segments articulated in rotation on the holding segments, about the two rotation axes, the connecting segment being articulated in rotation on the first and the second segments, about the two axes parallel to the first axis, said segments having a curved shape and this curved part being approximately centred on the second axis, the structure also comprising means of holding the orientation of each rotation axis of the segments on the holding segments, such that the angles between given axes and each of said rotation axes of segments on the holding segments remain constant.

The rotation axes of the segments on the holding segments are advantageously each held parallel to said given axes.

Even more advantageously, the given axes are parallel to each other and the rotation axes of the segments on the holding segments are parallel to each other.

Said means of holding the orientation of the rotation axes may for example be of the type with deformable parallelograms. Said means of holding the orientation may then comprise a holding connecting rod for each arm and a holding connecting rod for each forearm, each forming a deformable parallelogram with the arm or forearm.

Preferably, the first axis is in the plane containing the rotation axes of the connecting segment on the segments.

Even more preferably, the first axis is at an equal distance from the rotation axes of the connecting segment on the segments.

The second axis is advantageously in the plane containing the rotation axes of the segments on the holding segments.

The first axis is even more advantageously at an equal distance from the rotation axes of the segments on the holding segments.

Preferably, the first axis is concurrent with or intersects the second axis.

The reference gripping and manipulation position of the handle may be advantageously located at the intersection of the first rotation axis of the handle holder and the second rotation axis of the handle.

In one preferred embodiment, the first axis is in the plane containing the rotation axes of the connecting segment on the segments and at an equal distance from these axes, the first axis is also at equal distance from the rotation axes of the segments on the holding segments, the first axis is concurrent with or intersects the second axis, the second axis is in the plane containing the rotation axes of the segments on the holding segments, and the reference gripping and manipulation position of the handle is at the intersection of the first rotation axis of the handle holder and the second rotation axis of the handle.

The rotation axes of the segments on the holding segments and the rotation axes of the connecting segment on the segments are advantageously concurrent and orthogonal.

According to a second embodiment, the connecting segment is divided into two parts articulated to each other through a pivot connection, each part being articulated on a segment.

According to a first example of the second embodiment, the pivot connection is perpendicular to the rotation axes of the connecting segment on the segments, and is located between said axes.

According to a second example of the second embodiment, the connecting segment comprises a first approximately L-shaped element, one branch of which is articulated to one of the segments, about one of the rotation axes of the connecting segment on the segments, concurrent with one of the rotation axes of the segments on the forearms and the other branch is approximately parallel to the handle holder, and a second elbow-shaped element, said second element being articulated in rotation on the first element at a first end, said second element being articulated in rotation on the other segment, about an axis concurrent with the other rotation axis of the segments on the forearms, the rotation axes of the segments on the forearms and the rotation axes of the first element of the connecting segment and of the second element of the connecting segment on the segments being concurrent, and the articulation axis between the first element and the second element of the connecting segment being concurrent with the rotation axis of one of the segments on the forearms and the rotation axis of the first or second element of the connecting segment on one of the segments.

Advantageously, the first axis is concurrent with or intersects the second axis.

In one preferred variant, the concurrent point of the first and second axes is located at equal distance from the concurrent points of firstly the rotation axes of the first element of the connecting segment relative to the segment and of the segment relative to the forearm, and secondly the rotation axes of the second element of the connecting segment relative to the segment and of the segment relative to the forearm, and the reference position for gripping and manipulation of the handle is located at the intersection of the first rotation axis and the second rotation axis.

Regardless of the embodiment, the handle may be articulated on the handle holder at one of its ends.

According to the second example of the second embodiment, the articulation of the first and the second elements of the connecting segment may be facing the free end of the handle. As a variant, the articulation of the first and second elements of the connecting segment may be facing the end of the handle articulated on the handle holder.

The gearing down means are advantageously composed of a capstan and cable.

For example, the capstan and cable comprises at least one first pulley fixed onto one of the segments, and installed free to pivot on the connecting segment, its axis being coincident with the articulation axis of the connecting segment on said segment, and a second pulley fixed onto the handle holder and installed free to pivot on the connecting segment, its axis being coincident with the first rotation axis, a cable being wound around said pulleys, the ratio of the diameters between the two pulleys and the cableway defining the gearing down ratio of said gearing down means.

In one variant particularly well adapted to the first embodiment, the capstan also comprises two pulleys each fixed onto one of the segments, and installed free to pivot on the connecting segment, their axis being coincident with an articulation axis of the connecting segment on said segment, a cable connecting each of said pulleys to the pulley fixed on the handle holder.

In another embodiment, the gearing down means are formed by gear wheels or friction rollers. The gear wheels or friction rollers can comprise at least one first gear or roller fixed on one of the segments and installed free to pivot on the connecting segment, its axis being coincident with the articulation axis of the connecting segment on said segment, and a second gear or roller fixed onto the handle holder and installed to be free to pivot on the connecting segment, its axis being coincident with the first rotation axis, the ratio between the diameters of the two gears or rollers defining the gearing down ratio of said gearing down means.

Advantageously, the gearing down ratio is between 1 and 2. The gearing down ratio is equal to or approximately equal to 1.5. Even more advantageously, the gearing down ratio is equal to the square root of 2 or the gearing down ratio is equal to 1.4771.

Advantageously, a motor is installed in the handle holder capable of driving the handle about the second axis.

The structure according to the invention may comprise two motors supported by the base to act on the shoulders about fourth axes, two motors supported by the shoulders to act on the arms about fifth rotation axes, and two motors supported by the shoulders to act on the forearms about sixth axes through actuation connecting rods parallel to the arms.

Each of the motor(s) advantageously comprises an inertial flywheel at the end of its shaft.

Another subject-matter of this invention is a haptic interface comprising at least one structure according to this invention.

Another subject-matter of this invention is a robot comprising at least one structure according to this invention.

BRIEF DESCRIPTION OF THE DRAWINGS

This invention will be better understood using the description given below and the appended drawings in which:

FIG. 2A1 is a perspective view of a first variant of the wrist joint of the structure in FIG. 1A, FIG. 2A2 is a perspective view of a second variant of the wrist joint in the structure in FIG. 1A.

DETAILED PRESENTATION OF PARTICULAR EMBODIMENTS

In this application, axes are said to be "concurrent" when they intersect.

Figure 1A:
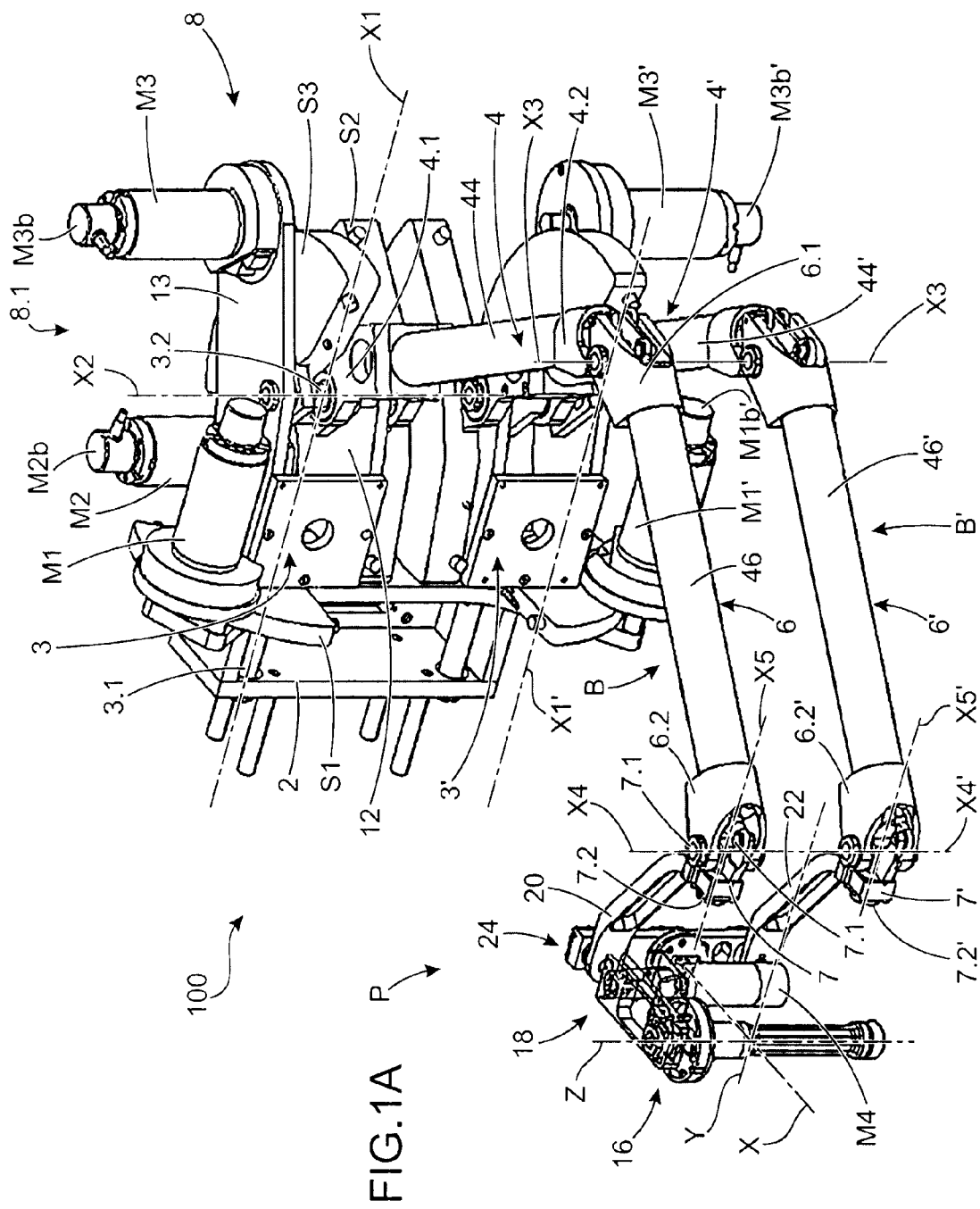
FIG. 1A is a perspective view of a first embodiment of a structure according to this invention.
Figure 1B:
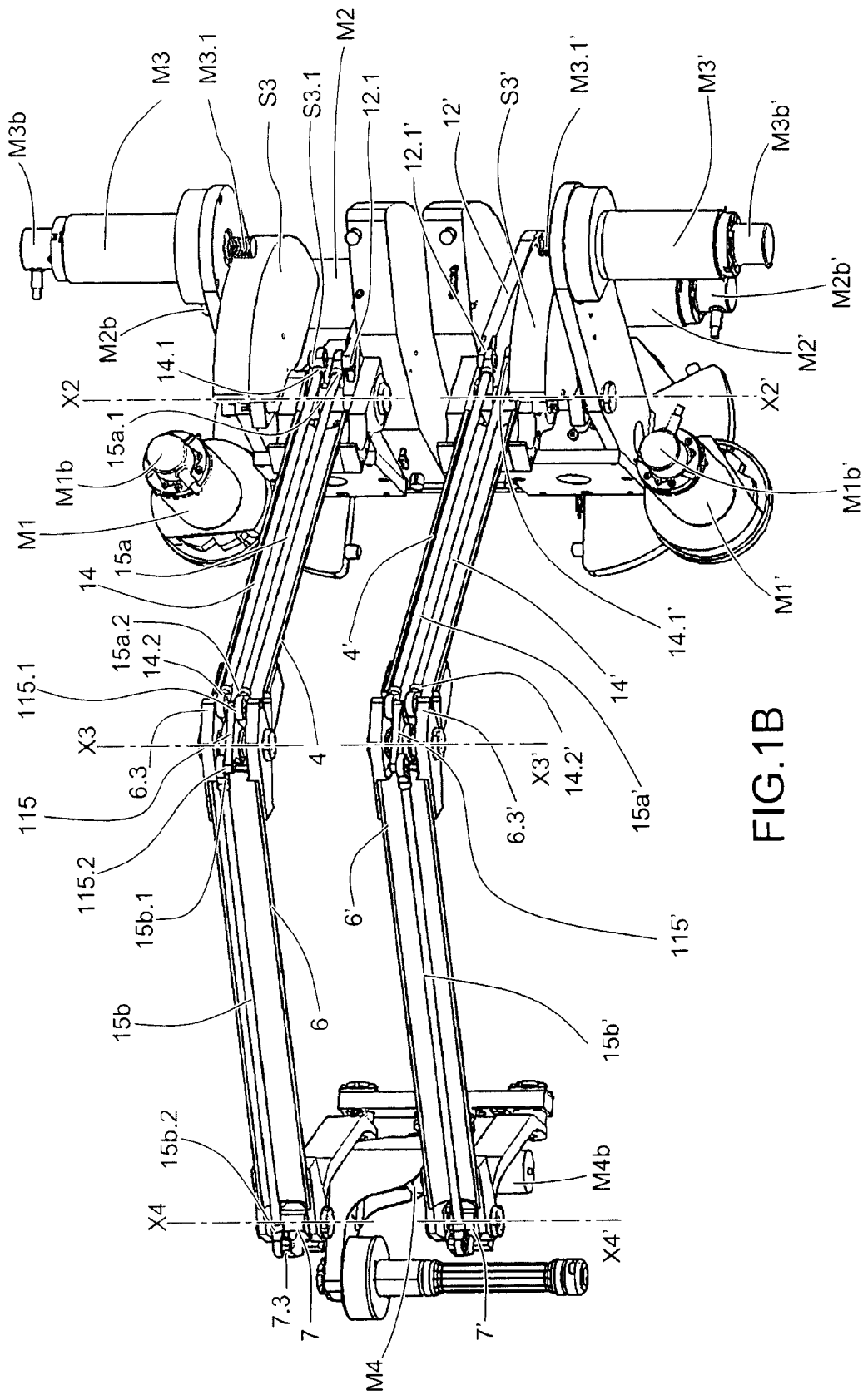
FIG. 1B is view identical to that in FIG. 1A in which the arm and the forearm of the robot are shown in section so that their internal mechanisms can be seen.

FIGS. 1A and 1B show a preferred embodiment of a haptic interface or robot structure 100 according to this invention.

The structure 100 comprises a base 2, two branches in parallel B, B' and a wrist joint P.

In the following description, some elements will be denoted by terms corresponding to the human body for reasons of clarity, these elements performing functions approximately equivalent in the case of a robot structure.

The base 2 formed by a frame composed of rigid plates in the example shown, is designed to be fixed, for example to a working table.

The two branches are approximately identical or symmetric, we will only describe branch B in detail.

Branch B comprises a shoulder 3 articulated at a first of its ends 3.1 on the base 2 about an axis X1, an arm 4 articulated about an axis X2 at a first of its ends 4.1 on a second end 3.2 of the shoulder 3, a forearm 6 articulated about an axis X3 at a first of its ends 6.1 on a second end 4.2 of the arm 4 and a holding segment 7 articulated about an axis X4 at a first of its ends 7.1 on a second end 6.2 of the forearm 6.

Axes X1 and X2 are not parallel and are advantageously perpendicular. The X2, X3 and X4 axes are advantageously parallel.

The wrist joint P is installed articulated on a second longitudinal end 7.2 of the holding segment 7.

The structure 100 comprises actuation means 8 between the base 2 and the wrist joint P to displace the branches B, B' and provide a counter reaction force in the case of a haptic interface.

These means 8 are distributed between articulations of branch B and articulations of branch B' and are similar, only means 8.1 applied to the branch B will be described in detail.

Actuation means 8.1 comprise a first electric motor M1 capable of applying a rotation movement or resisting the rotation movement of the shoulder 3 relative to the base about the X1 axis that is approximately horizontal in the representation in FIG. 1A.

Rotation of the shaft of motor M1 to the shoulder 3 is transmitted through an angular sector S1 driven according to the capstan and cable principle by a pulley fixed in rotation to the shaft of motor M1, the angular sector S1 being fixed to the shoulder 3.

This device is well known to those skilled in the art and the cable is not shown to make the figure more easily readable.

Advantageously, motor pulleys have a spiral surface to improve the cable grip and guide it better during actuation of the robot or the haptic interface.

However, these pulleys could obviously be smooth.

Similarly and advantageously, means of compensating for cable play, for example using return pins and springs, can be inserted on the sector S1, on the other angular sectors that will be described in the remainder of the description. This type of device is known to those skilled in the art and will not be described in detail.

Actuation means 8.1 also comprise a second motor M2 designed to move the arm 4 relative to the shoulder 3 or resist its displacement about axis X2.

The motor M2 is installed on the plate 12 forming part of the shoulder 3, therefore motor M2 is displaced when motor M1 is activated.

As for motor M1, rotation of the shaft of motor M2 is transmitted to the arm 4 through a sector S2 driven by the shaft of motor M2 using a capstan and cable type device.

The actuation means 8.1 also comprise a third motor M3 designed to move the forearm 6 independently of the arm 4 about the X3 axis parallel to the X2 axis. As for motors M1 and M2, the rotation movement or the resisting torque of a pulley M3.1 (visible in FIG. 1B) connected to the shaft of motor M3 is transmitted to the angular sector S3 articulated in rotation about the X2 axis relative to the shoulder 3 through a capstan and cable type device. To improve readability of the figures, the cable passing on sector S3 and pulley M3.1 is not shown, nor are the cables of the other actuation devices connected to the other motors.

This rotation movement is transmitted to the forearm through a connecting rod 14, one of the ends 14.1 of which is connected to the sector S3 through a rotation articulation S3.1 and the other end 14.2 is connected to the forearm through a rotation articulation 6.3, such that the actuation connecting rod 14 remains parallel to the arm 4, forming a deformable parallelogram with the arm 4.

This type of device is well known to those skilled in the art and will not be described in more detail herein.

As can be seen in FIG. 1B, in the example shown and particularly advantageously, the branch B comprises a set of connecting rods 15a, 15b designed to maintain the X5 axis of the rotation articulation between the segment 7 and the wrist joint P at a constant orientation relative to the X1 axis of the rotation articulation between the base 2 and the shoulder 3, and particularly advantageously parallel to this axis.

A first end 15a.1 of the connecting rod 15a is articulated in rotation about an axis parallel to X2 relative to the plate 12 of the shoulder 3 at one end 12.1.

A second end 15a.2 of the connecting rod 15a is articulated in rotation about an axis parallel to X3 about a first end 115.1 of a transmitter part 115 itself articulated about the X3 axis relative to the arm 4 and the forearm 6. A first end 15b.1 of the connecting rod 15b is articulated in rotation about an axis parallel to X3 about a second end 115.2 of the transmitter part 115. A second end 15b.2 of the connecting rod 15b is articulated in rotation about an axis parallel to the X4 axis about one end 7.3 of the holding segment 7.

Therefore the axes of all these articulations are parallel to the X3 axis and the distances between the axis X4 and the articulation axis connecting the ends 7.3 of the segment 7 and 15b.2 of the connecting rod 15b, between the X3 axis and the articulation axis connecting the ends 15b.1 of the connecting rod 15b and 115.2 of the transmitter part 115, between the X3 axis and the articulation axis connecting the ends 15a.2 of the connecting rod 15a and 115.1 of the transmitter part 115 and between the X2 axis and the articulation axis connecting the ends 15a.1 of the connecting rod 15a and 12.1 of the plate 12 are equal, such that the assemblies composed firstly of the plate 12, the connecting rod 15a, the transmitter part 115 and the arm 4, and secondly the transmitter part 115, the connecting rod 15b, the segment 7 and the forearm 6 form two parallelograms in series keeping the angle between the X5 and X1 axes constant.

Advantageously, the X1 and X5 axes are kept parallel.

The actuation means 8.2 of the branch B' are similar to the means 8.1.

They comprise a motor M1' to move or resist the displacement of the shoulder 3' relative to the base 2 about an axis X1', a motor M2' to move or resist the displacement of the arm 4' relative to the shoulder 3' about an axis X2' and a motor M3' to move or resist the displacement of the forearm 6' relative to the arm 4' about an axis X3' through a parallelogram type device composed of the arm 4', the sector S3', the actuation connecting rod 14' and the portion of the forearm 6' arranged between the axis X3' and the articulation 6.3'.

The means maintaining the angle between the axes X1' and X5' of the branch B' are also similar to those in branch B.

The assemblies composed firstly of the plate 12', the connecting rod 15a', the transmitter part 115' and the arm 4' and secondly the transmitter part 115', the connecting rod 15b', the segment 7' and the forearm 6' form two parallelograms in series holding the angle between the X5' and X1' axes constant.

Advantageously, the X1' and X5' axes are held parallel.

Thus, since the X1 and X1' axes are advantageously parallel, the X5 and X5' axes are also advantageously parallel.

Also advantageously, the actuation connecting rods 14, 14' and the connecting rods 15a, 15b, 15a', 15b' holding the orientation of the segments 7, 7' are routed inside tubes 44, 46, 44', 46' forming the body of the arm and the forearm, so that the device can be made more reliable because the risks of injury by trapping fingers between the arms, forearms and connecting rods are reduced.

Moreover, the actuation means M1, M2, M3 of branch B and the actuation means M1', M2', M3' of branch B' and the actuator M4 of the handle that will be described below, are provided with measurement devices or sensors M1b, M2b, M3b, M1b', M2b', M3b', M4b designed to measure their rotations, and therefore movements of the segments that they drive or that they oppose, so as to provide an appropriate control response.

Obviously, transmission of the rotation of motors to sectors actuating the branches may be transmitted by any other appropriate means, for example gear, belt or friction roller systems.

Obviously, actuation can be obtained by any type of appropriate motor, for example such as electric DC motors, autopiloted synchronous motors, asynchronous motors or even pneumatic or hydraulic actuators.

Braking systems can also be used to resist user movements, for example such as powder brakes, electro or magneto rheological fluid brakes or disk brakes.

Motors may also be combined with brakes on the different axes of the robot. This type of combination is known to those skilled in the art and will not be described in further detail herein.

Obviously, devices for the measurement of motor movements may be of any appropriate type, for example such as optical coders, potentiometers, Hall effect sensors, magneto-optic sensors.

Measurement devices of any one of these types could also be integrated directly into the articulations along the X1, X1' axes between the base 2 and the shoulders 3, 3', along the X2, X2' axes between the shoulders 3, 3' and the arms 4, 4', along the X3, X3' axes between the arms 4, 4' and forearms 6, 6', these measurement devices replacing or being additional to those of motors M1, M2, M3, M1', M2', M3'.

Advantageously, flywheels are provided on motor shafts to improve the stability of their instrumentation-control, and therefore improve the force performances of the robot or the haptic interface.

We will now describe the wrist joint P according to this invention in detail.

The wrist joint P is installed articulated on the ends 7.2 and 7.2' of the holding segments 7 and 7'.

More particularly, the wrist joint P is installed free to move in rotation on the ends 7.2 and 7.2' about an axis X5, X5' respectively, not parallel to and advantageously perpendicular to the X4, X4' axis respectively.

The wrist joint P comprises a handle 16 for the operator to grip it in the case of a haptic interface, a handle holder 18 on which the handle 16 is installed, a connecting segment 24 on which the handle holder 18 is installed and two segments 20, 22 to connect the connecting segment 24 to the holding segments 7, 7'.

In the case of a robot, the part that will interact with the outside, for example a gripping means such as a clip or a suction cup, is also referred to as a handle.

The handle may be a pen, a joystick, a ball, a clip, etc., depending on the envisaged applications, for example games, simulation devices, particularly for assembly, maintenance or training in technical skills or at the workstation, remote manipulation, remote operation or remote movement, for example in the nuclear field, in the aerospatial field or the medical field.

The handle 16 is free to move in rotation about three axes X, Y and Z.

Figure 2A:
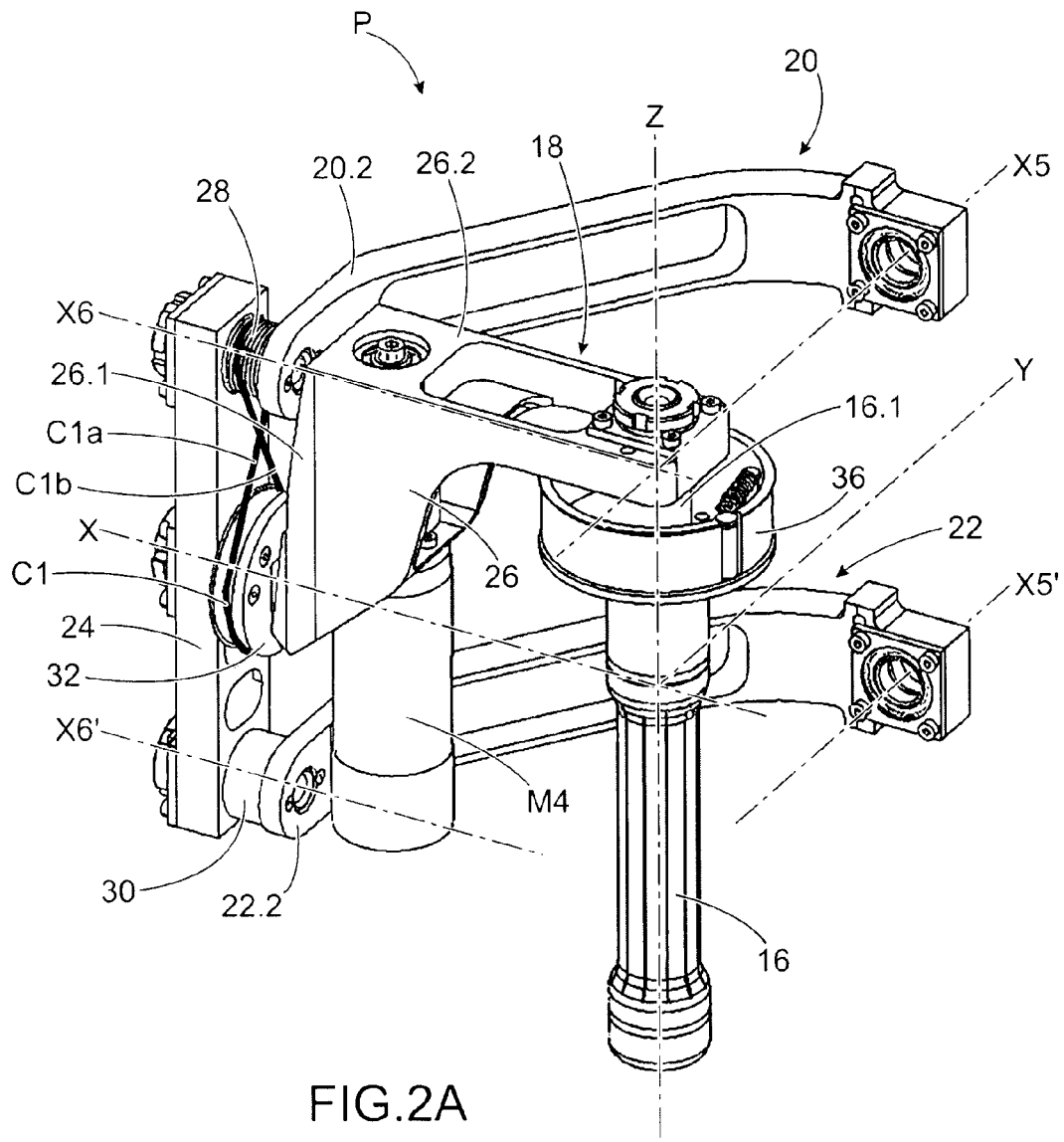
FIG. 2A is an enlarged view of the wrist joint in the structure in FIG. 1A.

In the example shown, the Z axis is coincident with the axis of the handle, and is vertical in the view shown in FIG. 2A.

The X and Y axes are contained in a plane that is advantageously orthogonal to the Z axis located between the two holding segments 7, 7' between the two branches.

The X axis is located in the median zone between the two rotation axes X6, X6' about which the connecting segment 24 is articulated onto the segments 20, 22.

The Y axis is located in the median zone between the two axes X5, X5', about which each segment 20, 22 is articulated onto the holding segments 7, 7'.

Figure 2B:
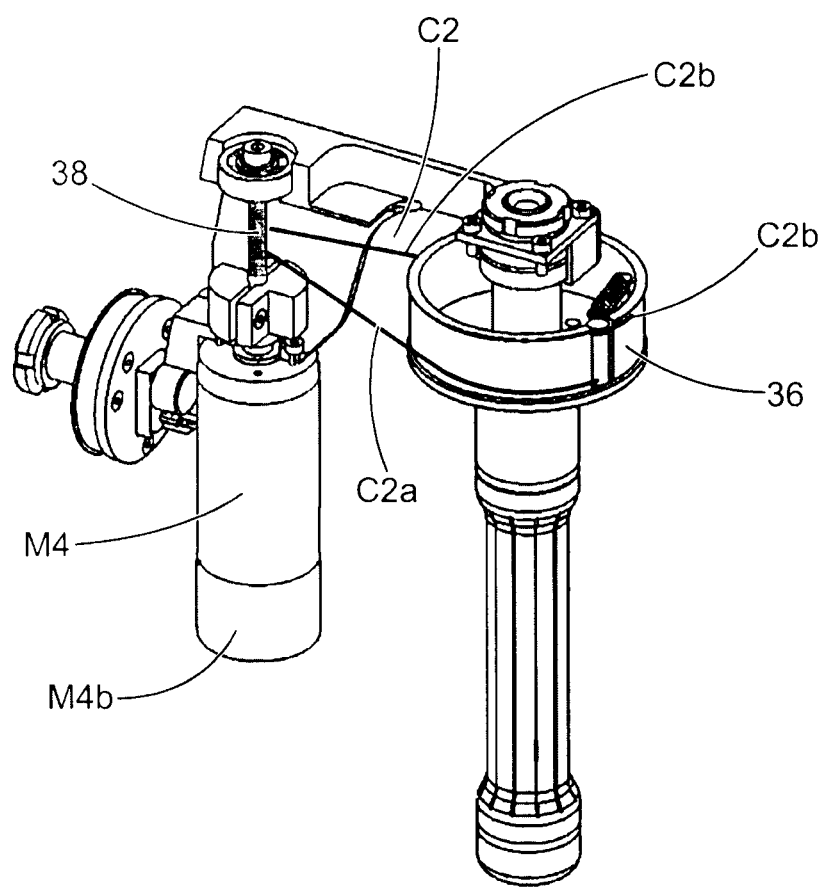
FIG. 2B is an enlarged view of the handle holder and the handle in FIG. 2A, in which some parts are shown in section so that the actuation mechanism of the handle can be seen.

FIGS. 2A and 2B show details of the wrist joint in FIG. 1. FIGS. 2A1 and 2A2 show variant embodiments of the wrist joint.

In FIG. 2A, the holding segment 24 is in the form of a plate connecting the two ends 20.2, 22.2 of segments 20, 22, opposite to the ends connected to the holding segments 7, 7' and the handle holder is L-shaped and is installed cantilevered from the connecting segment 24 and the handle is mounted at its end.

In the embodiment shown in FIG. 2A, the L-shaped part 26 comprises a branch approximately orthogonal to the Z axis and the handle is connected to the second branch of the L-shaped part by one of its longitudinal ends 16.1.

The connecting segment 24 is installed articulated about two rotation axes X6, X6' by two pivot connections onto the ends 20.2, 22.2 of segments 20, 22.

The L-shaped part 26 comprises a small branch 26.1 articulated in rotation about the X axis on the connecting segment between the two pivot connections of the X6 and X6' axes, advantageously at mid-distance from these axes.

Advantageously, the handle 16 is installed at the free end of the large branch 26.2 of the L-shaped part, so that the operator can easily grip the handle with his whole hand or his fingers.

Obviously, it would be possible for the handle and handle holder assembly to form a flat T part, the stand of the T being perpendicular to the connecting segment 24 and articulated in rotation on the connecting segment 24.

According to this invention, a gearing down ratio is introduced between the rotation of the handle holder 18 and handle 16 assembly about the X axis and the rotation movement of the connecting segment 24 relative to segments 20, 22 about the X6, X6' axes, such that the rotation of the handle about the X axis is amplified relative to the rotation of the connecting segment 24 connecting segments 20, 22.

This gearing down in the rotation movements can limit movements of the two branches B, B' towards each other end, while enabling large amplitude pivoting of the handle, more particularly about the X axis.

Therefore risks of collisions are reduced, and the work space becomes larger because the amplitude of rotation movements is increased.

Furthermore, rotation performances in terms of control speeds, forces and stiffnesses are improved and made uniform.

In the example shown, gearing down is obtained by a capstan and cable type system.

The gearing down system comprises a first pulley 28 fixed onto the segment 20 at its end 20.2. The connecting segment 24 is free in rotation about the X6 axis, and it rotates relative to the pulley 28. A second pulley 32 is fixed onto the L-shaped part 26 of the handle holder 18 and it rotates with the L-shaped part 26 about the X axis relative to the connecting segment 24. A cable C1 connects the pulleys 28 and 32. A first portion of the free cable C1a is fixed at one of its ends onto the pulley 32 while the other end goes to the pulley 28. The cable is then wound onto the pulley 28 several times to prevent any sliding between the pulley and the cable. This winding is not shown in the figures to improve readability. The pulley 28 is advantageously provided with a spiral surface to improve the cable grip. The cable portions C1a and C1b are crossed in this example embodiment.

Finally, a second portion of free cable C1b goes from the pulley 28 at one of its ends to the pulley 32 to which it is attached at its other end. Thus, any movement of the cable relative to one of the pulleys will cause rotation of the other pulley.

Obviously like the pulleys of motors M1, M2, M3, M1', M2', M3', the pulley 28 might be smooth, like the pulley 38 presented below. Similarly, as on sectors S1, S2, S3, S1', S2', S3', means of compensating for the cable play, for example using return pins and springs, may advantageously be introduced on pulley 32 and pulley 36 that will be presented subsequently. This type of device is known to those skilled in the art and will not be described in detail.

The ratio of the movements of the two pulleys depends on the ratio between their diameters. In this case, when the connecting segment moves in rotation relative to segments 20, 22 about the X6, X6' axes, one of the strands of the cable winds around the pulley 28 while the other unwinds from it.

The cable then drives the pulley 32 and therefore the handle holder 18 about the X axis. Similarly, when the user turns the handle about the X axis, the pulley 32 is driven in rotation relative to the connecting segment 24. This movement is transmitted by the cable C1 to the pulley 28 and the connecting segment 24 is moved in rotation relative to segments 20, 22 about the X6, X6' axes.

A part 30 is fixed to the segment 22 at its end 22.2. In the embodiment shown in FIG. 2A, this part is used only to fill in the offset between the connecting segment 24 and the segment 22 caused by introduction of the pulley 28 between the connecting segment 24 and the segment 20.

It would also be possible to put the cable C1 between the pulley 32 and the part 30.

In this case, it would advantageously be possible to form a thread on the part 30 so as to improve the grip of the cable on this part.

It would also be possible to put one of the strands of the cable C1 between the pulley 28 and the pulley 32 and the other strand between the pulley 32 and the part 30 so as to balance the system.

Finally, it would be possible to put a cable between the pulley 28 and the pulley 32 and a second cable between the pulley 32 and the part 30 so as to reinforce the device and to improve the capacities and the stiffness by doubling up the cable.

The gearing down ratio is advantageously chosen such that the movement of the handle is larger than the movement of the connecting segment 24 so as to limit collisions between the branches B, B' and such that the slaving stiffness in rotation is as uniform as possible in all directions and in all orientations of the work space.

The amplification ratio, in other words the ratio between the rotation angle of the handle holder 18 and the handle 16 about the X axis and the rotation angle of the connecting segment 24 about the X6, X6' axes, is preferably between 1 and 2.

These values of the amplification ratio can result in a uniform slaving stiffness in rotation in all directions and also in all orientations of the work space.

Even more preferably, this ratio is close to or equal to 1.5. It can thus be preferably equal to $\sqrt{2}$ or 1.4771.

The amplification ratio also depends on the cable route. FIG. 2A1 thus shows a variant of the device in which the two strands C1a and C1b of the cable do not cross. The result is then a different amplification ratio.

Gearing down may also be made by a belt or gear system. FIG. 2A2 shows a variant of the amplification device using gears or friction rollers. A first gear or roller 28 is fixed to the end 20.2 of the segment 20 to which it is fixed. A second gear or roller 32 is fixed to the branch 26.1 of the handle holder 26 to which it is fixed. The connecting segment 24 rotates relative to the gear 28 and to the segment 20 about the X6 axis and relative to the gear 32 and to the handle holder 26 about the X axis. Engagement of the teeth of the gears 28 and 32 (not shown in FIG. 2A2 for reasons of readability) or the entrainment of the rollers 28 and 32 by friction produces the amplification movement.

Depending on the type of mechanism chosen, the ratio of the radii of the pulleys or gears or rollers and the route of the cables or the number of gear teeth give different amplification ratios less than or greater than 1.

In the example shown, the rotation is geared down about the X axis. Gearing down about the Y axis can be achieved by adding a step down gear about the Y axis to the step down gear about the X axis or instead of the step down gear about the X axis.

For example, the rotation about the Y axis can be geared down by placing the connecting segment 24 in rotation about the X5, X5' axes between the holding segments 7 and 7', and by installing a segment similar to segment 20 at the centre of the connecting segment 24, the segment 20 then possibly rotating about the Y axis relative to the connecting segment 24.

The handle holder 18 would then be installed at the free end 20.2 of the segment 20, the segment 22 no longer existing in this case. A pulley similar to the pulley 28 would be fixed to the holding segment 7 and a pulley similar to the pulley 32 would be fixed to the segment 20. A cable similar to cable C1 would be placed between the pulley similar to pulley 28 and the pulley similar to pulley 32 and would make sure that the rotation movement of the segment 20 about the Y axis is amplified relative to the rotation movement of the connecting segment 24 about the X5, X5' axes. A motor would be installed close to or at the end 20.2 of the segment 20 and would directly drive the pulley 32 and therefore the handle holder 18 and the handle 16 about the X axis, which would then be coincident with the X6 axis. This entrainment could be made by any appropriate means, for example such as a capstan and cable, gears, a belt or friction rollers.

Similarly, the amplification movement about the Y axis could be made by any other appropriate means, for example such as gears, a belt or friction rollers.

Advantageously, the movement of the handle 16 about the Z axis can be controlled by means of a motor M4 onboard the handle holder 18.

In the example shown, the motor M4 is housed in the L-shaped part 26 along the small branch 26.1.

The rotation of the motor M4 is transmitted to the handle 16 by a cable C2 (shown in FIG. 2B on which the L-shaped part 26 is seen in a sectional view so that it can be seen) and a pulley 36 fixed in rotation to the handle 16.

The cable C2 comprises a first free portion C2A fixed to the pulley 36 at one of its ends and going as far as a pulley 38 fixed to the output shaft from the motor M4 at its other end. The cable C2 is rotated several turns around the pulley 38 so as to prevent any slip between the cable and the pulley. Finally, a second free portion of the cable C2b goes from the pulley 38 at one of its ends to the pulley 36 to which it is fixed at its other end.

Thus, any movement of the motor is transmitted to the handle and any movement of the handle is transmitted to the motor.

These movements are amplified by a ratio equal to the ratio between the diameters of the pulleys 36 and 38.

This type of capstan and cable device is known to those skilled in the art and will not be described in more detail herein.

It would be possible to install the motor M4 at a distance from the wrist joint, in this case the onboard mass is reduced but transmission systems will have to be provided for remote activation of the handle.

Particularly advantageously, the X axis is located in the plane containing the X6 and X6' axes. More advantageously the X axis is equidistant from the X6 and X6' axes. Even more advantageously, the Z axis and the X axis are concurrent. Decoupling in X is improved.

Also advantageously, the Z axis is located in the plane containing the X5 and X5' axes. Even more advantageously, the X axis is equidistant from the X5 and X5' axes. Decoupling in Y is improved.

If also and more advantageously, the gripping zone of the handle is located at the intersection point of the X and Z axes, equidistant both from the X5 and X5' axes and the X6 and X6' axes, the result obtained is very good decoupling between the rotation and translation movements so that almost pure rotation or translation movements can be obtained.

Advantageously, it would also be possible for the X5 and X6 axes to be concurrent and orthogonal respectively, similarly for the X5' and X6' axes. The result is that firstly the X5, X6 and Z axes, and secondly the X5', X6' and Z axes are concurrent when the handle is in its reference configuration corresponding to the vertical in FIG. 2A.

Also advantageously, the X and Z axes are perpendicular.

This arrangement can simplify models of the robot, particularly the direct and inverse geometric, kinetic, static and dynamic models that are therefore easier and faster to calculate. Since the frequency of the calculations is higher, operation of the controller managing the motors and performances of the robot or the haptic interface are improved. This also simplifies internal movements in the structure, which is less disturbing to the user.

In the example shown in FIGS. 1A and 1B, axes are made concurrent by the special shape of the segments 20, 22 connecting the connecting segment 24 to the ends 7.2, 7.2' of the supports segments 7, 7'.

Thus, the segments 20, 22 are curved at 90°, which makes it easy for the X5 and X6 axes and the X5' and X6' axes respectively, to be concurrent and perpendicular.

The curvature of segments 20, 22 can also clear the zone located at the end of the holding segments 7, 7' at which the concurrent point of the X, Y, Z, axes is located, so that the handle 16 and the user's hand can be housed at this location.

Figure 3:
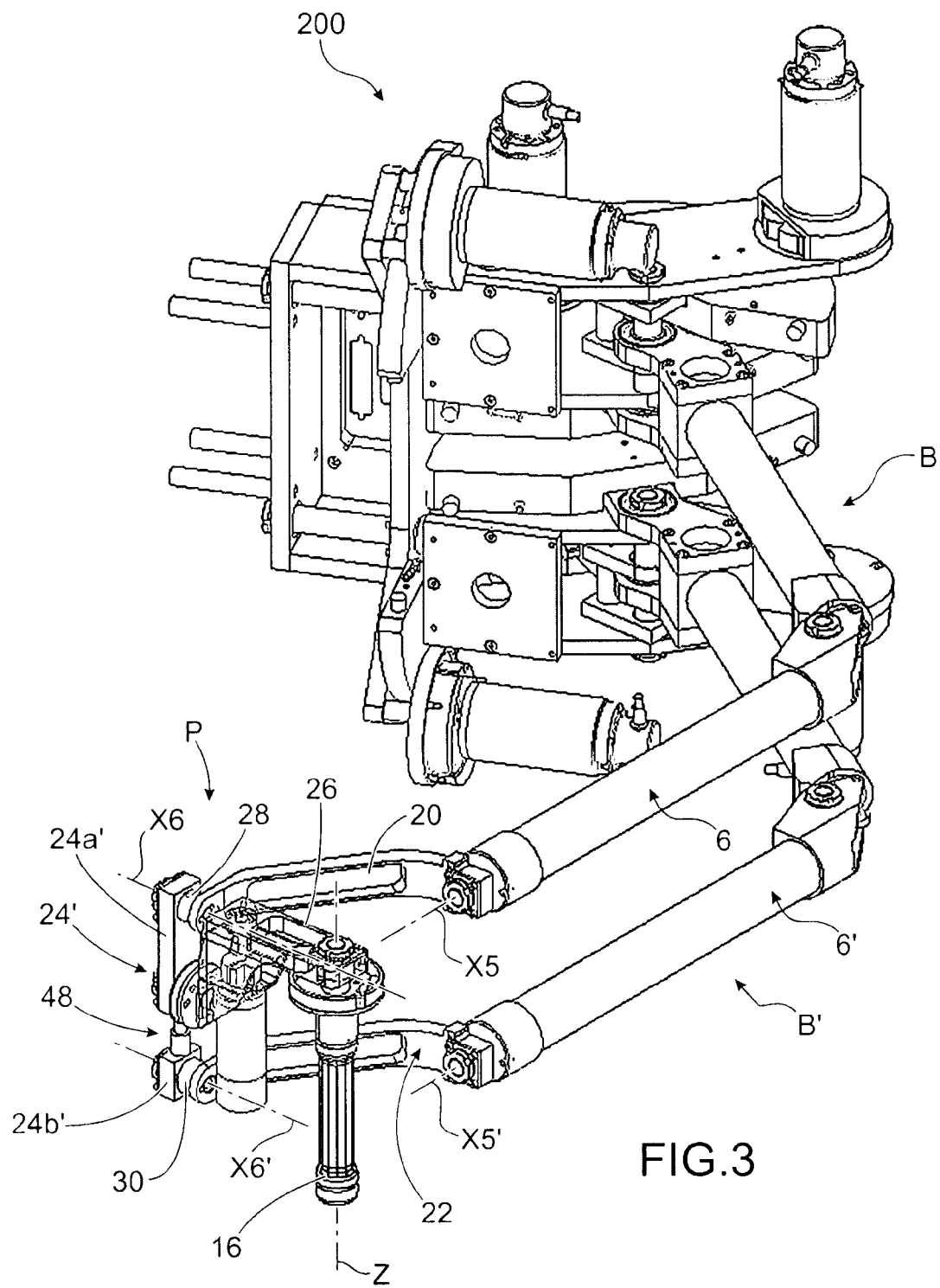
FIG. 3 is a perspective view of a second embodiment of a structure according to this invention.

FIG. 3 shows an embodiment of a structure 200 according to this invention in which the orientations of the X5, X5' axes are not kept constant.

Therefore, the device in FIG. 3 does not include any parallelogram type deformable holding means. On the other hand, the actuation of the forearms 6, 6' by motors M3, M3' is still obtained by actuation parallelograms as in the case of the structure 100 and based on the same principle as the structure 100 that will not be described herein. Therefore, the structure of the branches is simplified.

A rotational degree of freedom is added at the connecting segment 24 to enable a change in the relative orientation of the X5 and X5' axes and the X6 and X6' axes respectively.

In this case, the rotation axes X, Y, Z of the handle 16 no longer necessarily respect the concurrence conditions with axes X5, X5' and X6, X6' and/or distances to them mentioned above when the handle is moved in translation or in rotation.

FIG. 3 shows an example embodiment in which this degree of freedom can be created.

Therefore a pivot connection 48 is made between two portions 24a' and 24b' of the connecting segment 24' located between the pivot connections of the X6, X6' axes.

In this case, the rotation amplification mechanism of the handle holder 18 and handle 16 assembly relative to the rotation of the connecting segment 24' is made on a single side of the connection segment 24', for example 24a' in FIG. 3. The collisions between branches B, B' are still limited and singularities no longer occur for larger orientation values.

Figure 4:
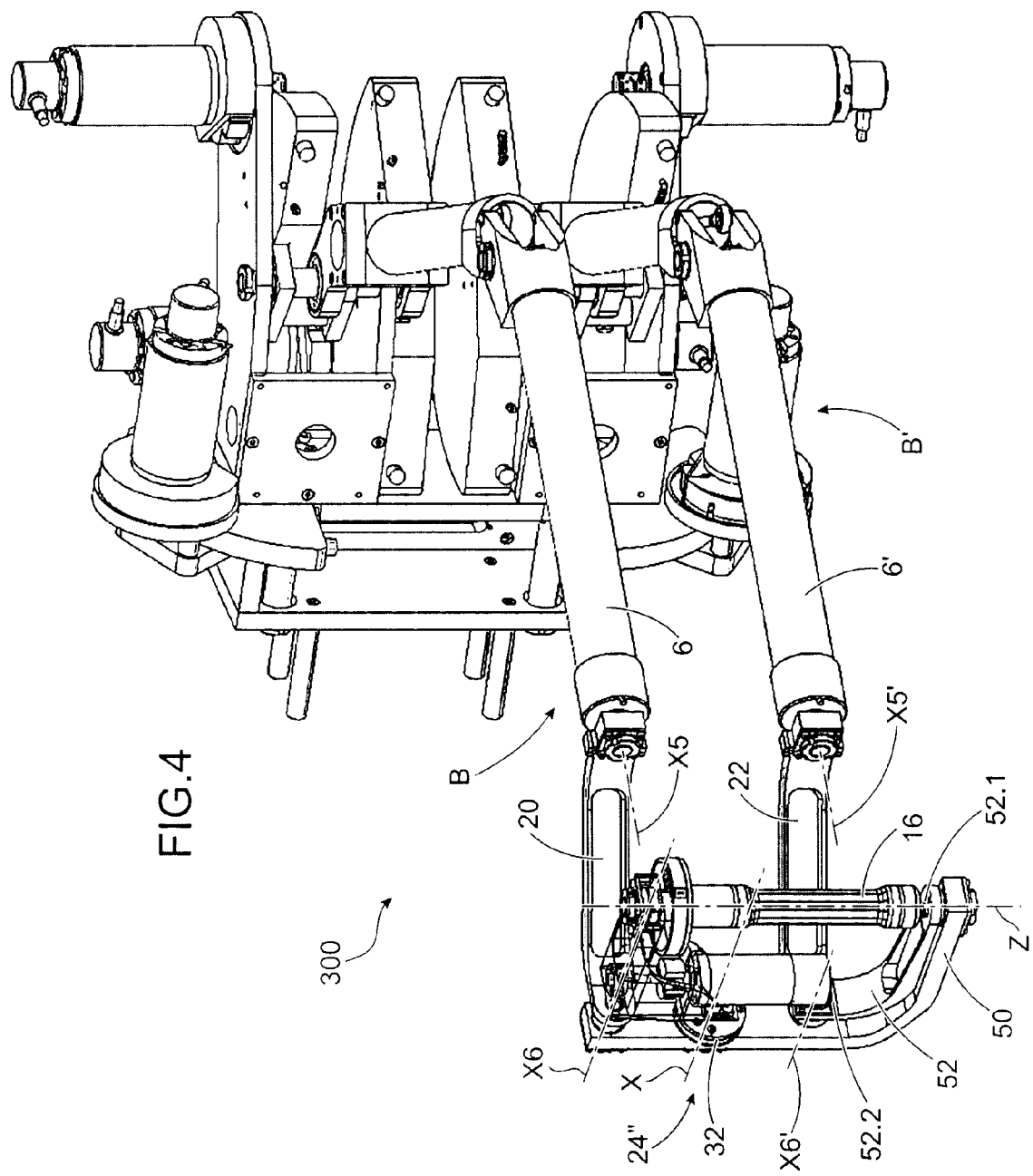
FIG. 4 is a perspective view of a variant of the second embodiment.

FIG. 4 shows an advantageous variant embodiment of a structure 300 according to the second embodiment in which the connecting segment 24" is extended by a curved portion 50 under the handle 16, and in which a segment 52 with a curved shape corresponding to the shape of the portion 50 is superposed on the portion of segment 50. The segment 52 is installed articulated in rotation at a first of its ends 52.1 on the portion of segment 50, the rotation axis being coincident with the Z axis in the reference configuration in which the handle is shown vertically, and the other of its ends 52.2 on the segment 22 about the X6' axis. The segment 22 is installed articulated in rotation relative to the forearm of the branch B' about the X5' axis. Advantageously, the rotation articulation axis X6' between the segment 52 and the segment 22 is concurrent with the X5' axis and the articulation axis between the portion of segment 50 and segment 52. Even more advantageously, the X5' and X6' axes are perpendicular, and the X6' axis and the articulation axis between the portion of segment 50 and segment 52 are also perpendicular.

FIG. 4 also shows that the connecting segment 24" is articulated in rotation on segment 20 about the X6 axis, the segment 20 itself being articulated in rotation on the forearm of the branch B about the X5 axis. Advantageously, the X5 and X6 axes are concurrent and even more advantageously are perpendicular.

Thus, the connecting segment 24" is connected to the forearm 6 by a universal joint connection between the concurrent and advantageously perpendicular X5 and X6 axes, and it is connected to the forearm 6' by a ball joint connection in which the X5', X6' axes and the connecting axis between the portion 50 and the segment 52 are concurrent.

If the X rotation axis of the pulley 32 relative to the connecting segment 24" is concurrent with the Z axis of the handle and the concurrent point of these axes is at an equal distance from the concurrent points of the X5, X6 and X5', X6' axes and the reference position for gripping and manipulation of the handle is at the intersection of the X axis and the Z axis, then decoupling occurs between the translation and rotation movements.

Figure 5:
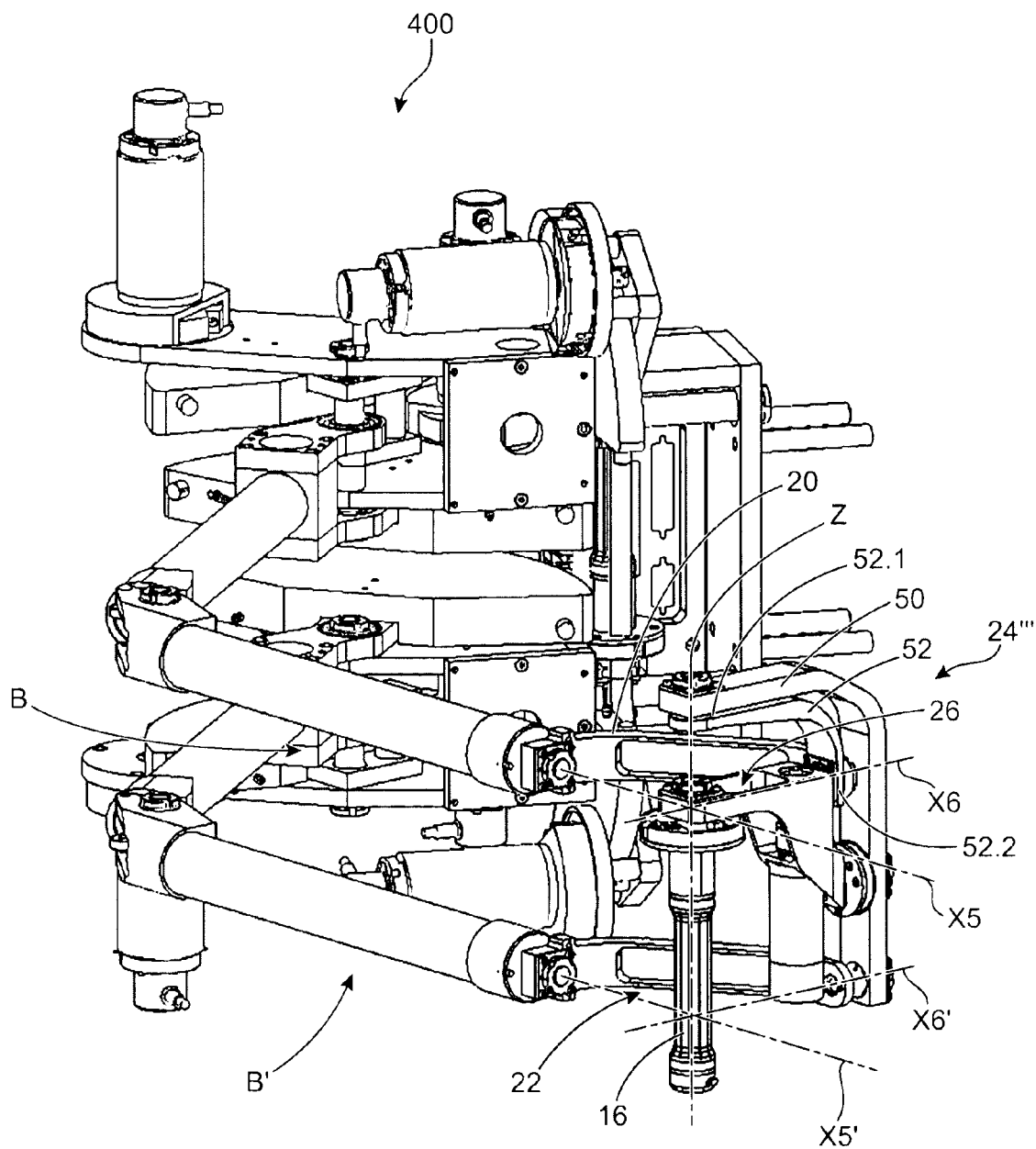
FIG. 5 is a perspective view of another variant of the second embodiment.

FIG. 5 shows a variant of a structure 400 according to the second embodiment similar to that in FIG. 4, in which the free end of the handle 16 is completely free, which can be advantageous in some applications.

The X6' rotation axis of the connecting segment 24''' relative to segment 22 is still concurrent with the X5' rotation axis of the segment 22 relative to the forearm 6' of the branch B' and advantageously perpendicular to it.

In this variant, the segment 52 is articulated to the segment 20. The rotation axis X6 of segment 52 relative to the segment 20 is concurrent with the rotation axis X5 of the segment 20 relative to the forearm 6 of branch B, and advantageously perpendicular to it, and these two axes are concurrent with the articulation axis between the portion 50 and the segment 52. Also advantageously, the X6 axis is perpendicular to the articulation axis between the portion of segment 50 and segment 52.

The segment 50 and the segment 52 are then arranged above the L-shaped part 26, making the space around the free end of the handle 16 easily accessible.

The measurement devices described above could also be included directly in the articulation along the Z axis between the handle holder 18 and the handle 16, these measurement devices replacing or being additional to those of motor M4.

Redundant measurement devices could also be placed along the X4, X4' axes between the forearms 6, 6' and the holding segments 7, 7', along the X5, X5' axes between the holding segments 7, 7' and segments 20, 22, between the forearms 6, 6' and segments 20, 22, respectively, along the X6, X6' axes between segments 20, 22 and the connecting segment 24 or its portions 24a', 24b', 24", 52, 24''', 52, along the articulation axis between segments 50 and 52 and along the X axis between the holding segment 24, 24', 24", 24''' and the handle holder 18, either along all the above-mentioned axes or only along some of them.

In the case of a haptic interface, the motors are controlled to provide a force feedback as a function of interactions in the simulation in virtual reality or as a function of interactions between the remote robot and its environment. In the case of a robot, the motors are controlled to make movements or to apply forces programmed by the user and/or as a function of measurements of robot sensors and external sensors.

Obviously, the orientation of the rotation axes as shown in the figures is in no way limitative, the axes shown vertically could be horizontal depending on the arrangement of the structure or inclined at a certain angle. This comment is also applicable to the reference configuration of the handle shown in a vertical position in the figures.

With the structure according to this invention, the result is a simple haptic interface or a robot with two branches in parallel with improved performances obtained by shifting singularities to the limits of the displacements of the handle and increasing the work space due to a limitation of collisions between the robot branches.

The appropriate choice of the gearing down ratio can also improve performances in control forces and stiffnesses.

In all embodiments, the amplification device may use pulleys and crossed or uncrossed cables, gears or belts or may be of any other appropriate type.

In one particularly advantageous embodiment, the structure according to this invention enables decoupling between rotation and translation movements.

The invention claimed is:

1. A structure with six degrees of freedom for a robot or haptic interface comprising:
   a base;
   a wrist joint comprising a connecting segment onto which a handle holder is articulated about a first rotation axis, a handle articulated in rotation on the handle holder about a second rotation axis, said handle being capable of being moved in rotation about the first axis, the second axis and a third axis;
   two branches in parallel, said branches being installed articulated at one end on the base and at the other end on the wrist joint, said branches each comprising a shoulder at the base, an arm and a forearm at the wrist joint, the forearm being articulated onto the arm; and
   a gearing down device which gears down the rotation of said handle holder about at least the first rotation axis relative to rotation of the connecting segment.

2. A structure according to claim 1, in which at least two of the axes are orthogonal.

3. A structure according to claim 1, in which the wrist joint further comprises two segments connecting the connecting segment to the forearms, the connecting segment being articulated in rotation on the first and second segments about two axes, one of said two axes being parallel to the first axis, said segments each being articulated in rotation on the forearms about the two axes, said segments having a curved shape centered approximately on the second axis.

4. A structure according to claim 1, further comprising:
   holding segments at the end of the forearms and in which the wrist joint further comprises two segments articulated in rotation on the holding segments about the rotation axes, the connecting segment being articulated in rotation on the first and the second segments about two axes parallel to the first axis, said segments having a curved shape centered approximately on the second axis,
   the structure further comprising a device holding orientation of each rotation axis of the segments on the holding segments, such that angles between given axes and each of said rotation axes of segments on the holding segments remain constant.

5. A structure according to claim 4, in which the rotation axes of the segments on the holding segments are each held parallel to said given axes.

6. A structure according to claim 4, in which the given axes are parallel to each other and the rotation axes of the segments on the holding segments are parallel to each other.

7. A structure according to claim 4, in which said device holding orientation of the rotation axes is of type with deformable parallelograms.

8. A structure according to claim 7, in which said device holding orientation comprises a holding connecting rod for each arm and a holding connecting rod for each forearm, each forming a deformable parallelogram with the arm or forearm.

9. A structure according to claim 4, in which the first axis is in the plane containing the rotation axes of the connecting segment on the segments.

10. A structure according to claim 9, in which the first axis is at an equal distance from the rotation axes of the connecting segment on the segments.

11. A structure according to claim 4, in which the second axis is in the plane containing the rotation axes of the segments on the holding segments.

12. A structure according to claim 11, in which the first axis is at an equal distance from the rotation axes of the segments on the holding segments.

13. A structure according to claim 1, in which the first axis is concurrent with or intersects the second axis.

14. A structure according to claim 13, in which a reference gripping and manipulation position of the handle is located at an intersection of the first rotation axis of the handle holder and the second rotation axis of the handle.

15. A structure according to claim 4, in which the first axis is in the plane containing the rotation axes of the connecting segment on the segments and at an equal distance from these axes, the first axis is also at equal distance from the rotation axes of the segments on the holding segments, the first axis is concurrent with or intersects the second axis, the second axis is in the plane containing the rotation axes of the segments on the holding segments, and in which a reference gripping and manipulation position of the handle is at an intersection of the first rotation axis of the handle holder and the second rotation axis of the handle.

16. A structure according to claim 15, in which the rotation axes of the segments on the holding segments and the rotation axes of the connecting segment on the segments are concurrent and orthogonal.

17. A structure according to claim 1, in which the connecting segment is divided into two parts articulated to each other through a pivot connection, each part being articulated on a segment.

18. A structure according to claim 17, in which the pivot connection is perpendicular to the rotation axes of the connecting segment on the segments and is located between said axes.

19. A structure according to claim 17, in which the connecting segment comprises a first approximately L-shaped element, one branch of which is articulated to one of the segments about one of the rotation axes of the connecting segment on the segments concurrent with one of the rotation axes of the segments on the forearms and the other branch is approximately parallel to the handle holder, and a second elbow-shaped element, said second element being articulated in rotation on the first element at a first end, said second element being articulated in rotation on the other segment about an axis concurrent with the other rotation axis of the segments on the forearms, the rotation axes of the segments on the forearms and the rotation axes of the first element and of the second element of the connecting segment on the segments being concurrent, and the articulation axis between the first element and the second element being concurrent with the rotation axes.

20. A structure according to claim 19, in which the first axis is concurrent with or intersects the second axis.

21. A structure according to claim 20, in which a concurrent point of the first and second axes is located at equal distance from concurrent points of firstly the rotation axes of the connecting segment relative to the segment and of the segment relative to the forearm, and secondly the rotation axes of the segment relative to the segment and of the segment relative to the forearm, and a reference position for gripping and manipulation of the handle is located at an intersection of the first rotation axis and the second rotation axis.

22. A structure according to claim 1, in which the handle is articulated on the handle holder at one of its ends.

23. A structure according to claim 19, in which the handle is articulated on the handle holder at one of its ends and in which the articulation of the first and the second elements of the connecting segment is facing a free end of the handle.

24. A structure according to claim 19, in which the handle is articulated on the handle holder at one of its ends and in which the articulation of the first and the second elements of the connecting segment is facing the end of the handle articulated on the handle holder.

25. A structure according to claim 4, in which the gearing down device includes a capstan and a cable.

26. A structure according to claim 25, in which the capstan and cable comprises at least one first pulley fixed onto one of the segments and installed free to pivot on the connecting segment, its axis being coincident with the articulation axis of the connecting segment on said segment, and a second pulley fixed onto the handle holder and installed free to pivot on the connecting segment, its axis being coincident with the first rotation axis, a cable being wound around said pulleys, the ratio of diameters between the two pulleys and the cableway fixing the gearing down ratio of said gearing down device.

27. A structure according to claim 26, in which the capstan further comprises two pulleys each fixed onto one of the segments and installed free to pivot on the connecting segment, their axis being coincident with an articulation axis of the connecting segment on said segment, a cable connecting each of said pulleys to the pulley fixed on the handle holder.

28. A structure according to claim 4, in which the gearing down device is formed by gear wheels or friction rollers.

29. A structure according to claim 28, in which the gear wheels or friction rollers comprise at least one first gear or roller fixed on one of the segments installed free to pivot on the connecting segment, its axis being coincident with the articulation axis of the connecting segment on said segment, and a second gear or roller fixed to the handle holder and installed free to pivot on the connecting segment, its axis being coincident with the first rotation axis, the ratio between the diameters of the two gears or rollers defining the gearing down ratio of said gearing down device.

30. A structure according to claim 27, in which the gearing down device includes a capstan and a cable.

31. A structure according to claim 23, in which the gearing down device includes a capstan and a cable.

32. A structure according to claim 24, in which the gearing down device includes a capstan and a cable.

33. A structure according to claim 30, in which the capstan and cable comprises at least a first pulley fixed onto one of the segments and installed free to pivot on the connecting segment, its axis being coincident with the articulation axis of the connecting segment on said segment, and a second pulley fixed onto the handle holder and installed free to pivot on the connecting segment, its axis being coincident with the first rotation axis, a cable being wound around said pulleys, the ratio of the diameters between the two pulleys and the cableway defining the gearing down ratio of said gearing down device.

34. A structure according to claim 31, in which the capstan and cable comprises at least a first pulley fixed onto one of the segments and installed free to pivot on the connecting segment, its axis being coincident with the articulation axis of the connecting segment on said segment, and a second pulley fixed onto the handle holder and installed free to pivot on the connecting segment, its axis being coincident with the first rotation axis, a cable being wound around said pulleys, the ratio of the diameters between the two pulleys and the cableway defining the gearing down ratio of said gearing down device.

35. A structure according to claim 32, in which the capstan and cable comprises at least a first pulley fixed onto one of the segments and installed free to pivot on the connecting segment, its axis being coincident with the articulation axis of the connecting segment on said segment, and a second pulley fixed onto the handle holder and installed free to pivot on the connecting segment, its axis being coincident with the first rotation axis, a cable being wound around said pulleys, the ratio of the diameters between the two pulleys and the cableway defining the gearing down ratio of said gearing down device.

36. A structure according to claim 27 in which the gearing down device includes gears or friction rollers.

37. A structure according to claim 23, in which the gearing down device includes gears or friction rollers.

38. A structure according to claim 24, in which the gearing down device includes gears or friction rollers.

39. A structure according to claim 36, in which the gears or friction rollers comprise at least a first gear or roller fixed onto one of the segments and installed free to pivot on the connecting segment, its axis being coincident with the articulation axis of the connecting segment on said segment, and a second gear or roller fixed onto the handle holder and installed free to pivot on the connecting segment, its axis being coincident with the first rotation axis, the ratio between the diameters of the two gears or rollers defining the gearing down ratio of said gearing down device.

40. A structure according to claim 37, in which the gears or friction rollers comprise at least a first gear or roller fixed onto one of the segments and installed free to pivot on the connecting segment, its axis being coincident with the articulation axis of the connecting segment on said segment, and a second gear or roller fixed onto the handle holder and installed free to pivot on the connecting segment, its axis being coincident with the first rotation axis, the ratio between the diameters of the two gears or rollers defining the gearing down ratio of said gearing down device.

41. A structure according to claim 38, in which the gears or friction rollers comprise at least a first gear or roller fixed onto one of the segments and installed free to pivot on the connecting segment, its axis being coincident with the articulation axis of the connecting segment on said segment, and a second gear or roller fixed onto the handle holder and installed free to pivot on the connecting segment, its axis being coincident with the first rotation axis, the ratio between the diameters of the two gears or rollers defining the gearing down ratio of said gearing down device.

42. A structure according to claim 1, in which the gearing down ratio is between 1 and 2.

43. A structure according to claim 42, in which the gearing down ratio is equal to or approximately equal to 1.5.

44. A structure according to claim 42, in which the gearing down ratio is equal to the square root of 2.

45. A structure according to claim 42, in which the gearing down ratio is equal to 1.4771.

46. A structure according to claim 1, in which a motor is installed in the handle holder capable of driving the handle about the second axis.

47. A structure according to claim 1, comprising two motors supported by the base to act on the shoulders about fourth axes, two motors supported by the shoulders to act on the arms about fifth rotation axes, and two motors supported by the shoulders to act on the forearms about sixth axes through actuation connecting rods parallel to the arms.

48. A structure according to claim 4, further comprising two motors supported by the base to act on the shoulders about fourth axes, two motors supported by the shoulders to act on the arms about fifth rotation axes, and two motors supported by the shoulders to act on the forearms about sixth axes through actuation connecting rods parallel to the arms, et in which the rotation axes of segments on the holding segments are parallel to fourth axes forming the given axes.

49. A structure according to claim 46, in which the motor comprises an inertial flywheel at the end of its shaft.

50. A structure according to claim 47, in which each of the motor(s) comprises an inertial flywheel at the end of its shaft.

51. A structure according to claim 48, in which each of the motor(s) comprises an inertial flywheel at the end of its shaft.

52. A haptic interface comprising at least one structure according to claim 1.

53. A robot comprising at least one structure according to claim 1.

* * * * *